Figure 1:
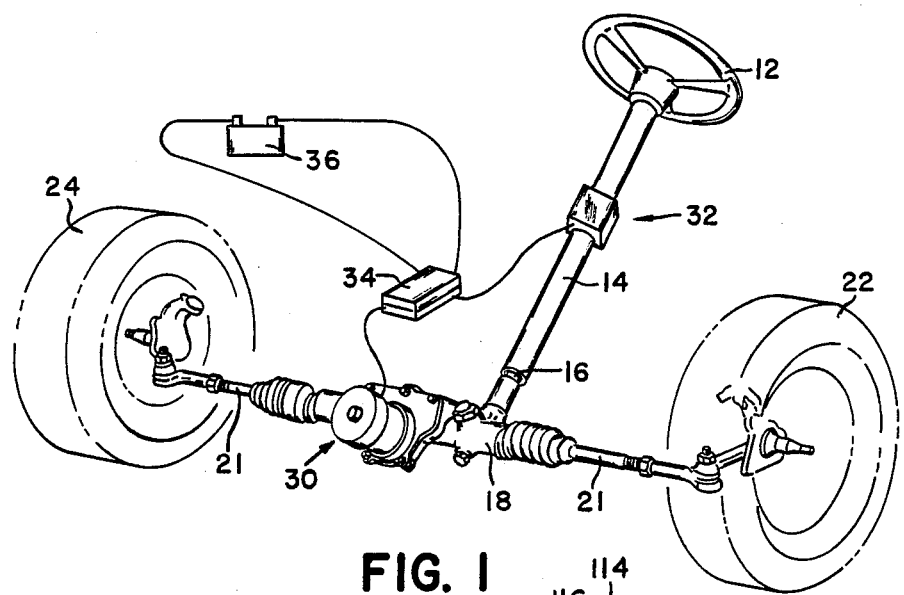

United States Patent [19]

Taig

[11] Patent Number: 4,570,734
[45] Date of Patent: Feb. 18, 1986

[54] POWER ASSIST DEVICE FOR A VEHICLE STEERING SYSTEM

[75] Inventor: Alistair G. Taig, South Bend, Ind.

[73] Assignee: Allied Corporation, Morristown, N.J.

[21] Appl. No.: 587,418

[22] Filed: Mar. 8, 1984

[51] Int. Cl.[4] .................. H04L 15/04; H04R 1/28; B62D 1/20
[52] U.S. Cl. .................... 180/79.1; 74/497; 74/498; 180/148
[58] Field of Search ............... 180/79.1, 148; 74/497, 74/498

[56] References Cited

U.S. PATENT DOCUMENTS 2,109,418  2/1938  Fuller .................. 180/79.1
4,223,254  9/1980  Adams .................. 318/2

Primary Examiner—John J. Camby
Attorney, Agent, or Firm—Larry J. Palguta; Ken C. Decker

[57] ABSTRACT

A power assist device for a vehicle steering system includes an electric motor coupled to a steering linkage via a plurality of gears and a yoke-like connection to provide a variable ratio steering system.

18 Claims, 3 Drawing Figures

POWER ASSIST DEVICE FOR A VEHICLE STEERING SYSTEM

The present invention relates to a power assist device for a vehicle steering system. The power assist device includes an electric motor so that the vehicle can operate without a power steering pump and the associated fluid lines connecting the power steering pump with a pressure chamber.

It is known that an electric motor can be used with a steering system in a vehicle to provide a power assist. The electric motor is connected via suitable gears with a steering shaft and sensors are provided to generate signals in response to torque applied to the steering shaft. The signals control operation of the electric motor so that the electric motor is selectively operated in response to the torque applied to the steering shaft. With the electric motor connected to the steering shaft, the power assist is transmitted through the steering shaft to the steering gear.

The prior art is illustrated in U.S. Pat. Nos. 3,893,534 (Steinmann); 4,241,804 (Deininger et al); 4,223,254 (Adams); 3,983,953 (Bayle); 3,511,104 (Piat); 3,534,623 (Goodacre et al.); and 3,191,109 (Hepner).

The present invention comprises a power assist device for a vehicle steering system having a steering wheel connected to a steering gear to control the vehicle direction of travel by means of a pair of dirigible wheels cooperating with the steering gear via a steering linkage, the power assist device comprising an electric motor fixedly carried by the vehicle adjacent the steering linkage and remote from the steering gear, a plurality of gears cooperating with the electric motor and the steering linkage to impart movement to the latter in response to operation of the electric motor, one of said plurality of gears cooperating with said steering linkage to define a yoke-like connection providing a variable ratio between said one gear and said steering linkage so that for a predetermined movement for said one when said one gear is moved from a rest position corresponding to straight ahead travel for the vehicle than when said one gear is moved from an end position corresponding to turning the vehicle.

It is an advantage of the present invention that the electric motor is coupled to the steering system at the steering linkage to avoid force transfer through the steering gear during a power assist. Moreover, the plurality of gears are orientated relative to the steering linkage to provide a variable ratio steering assist by means of a simple yoke-like connection.

Figure 2:
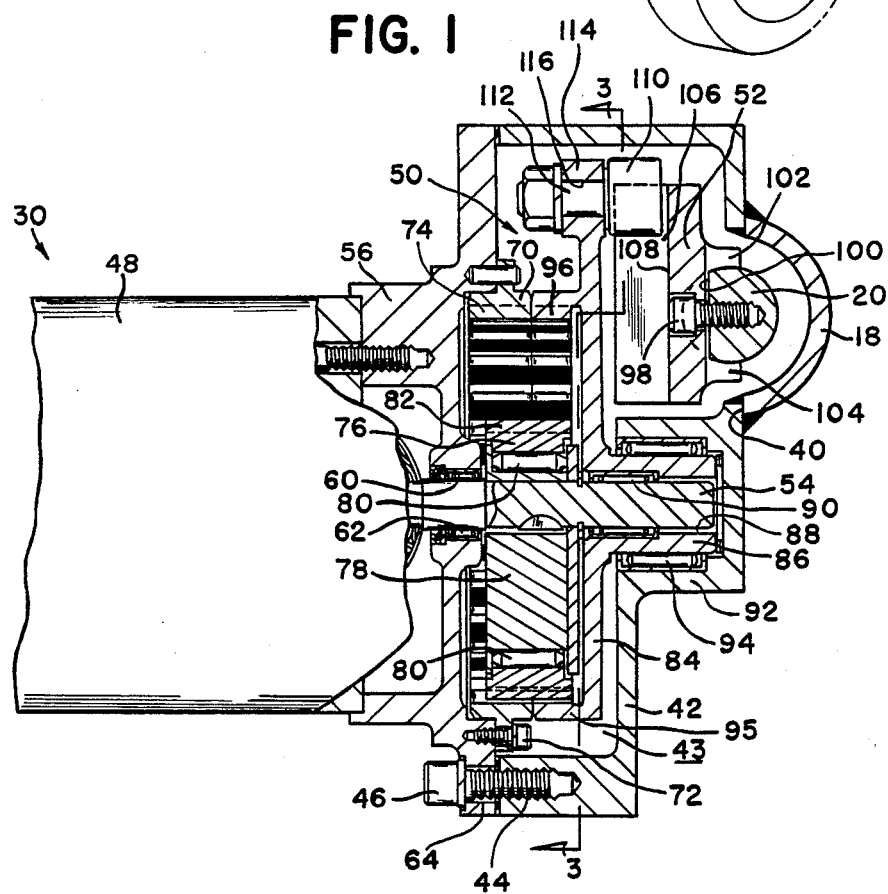
Figure 3:
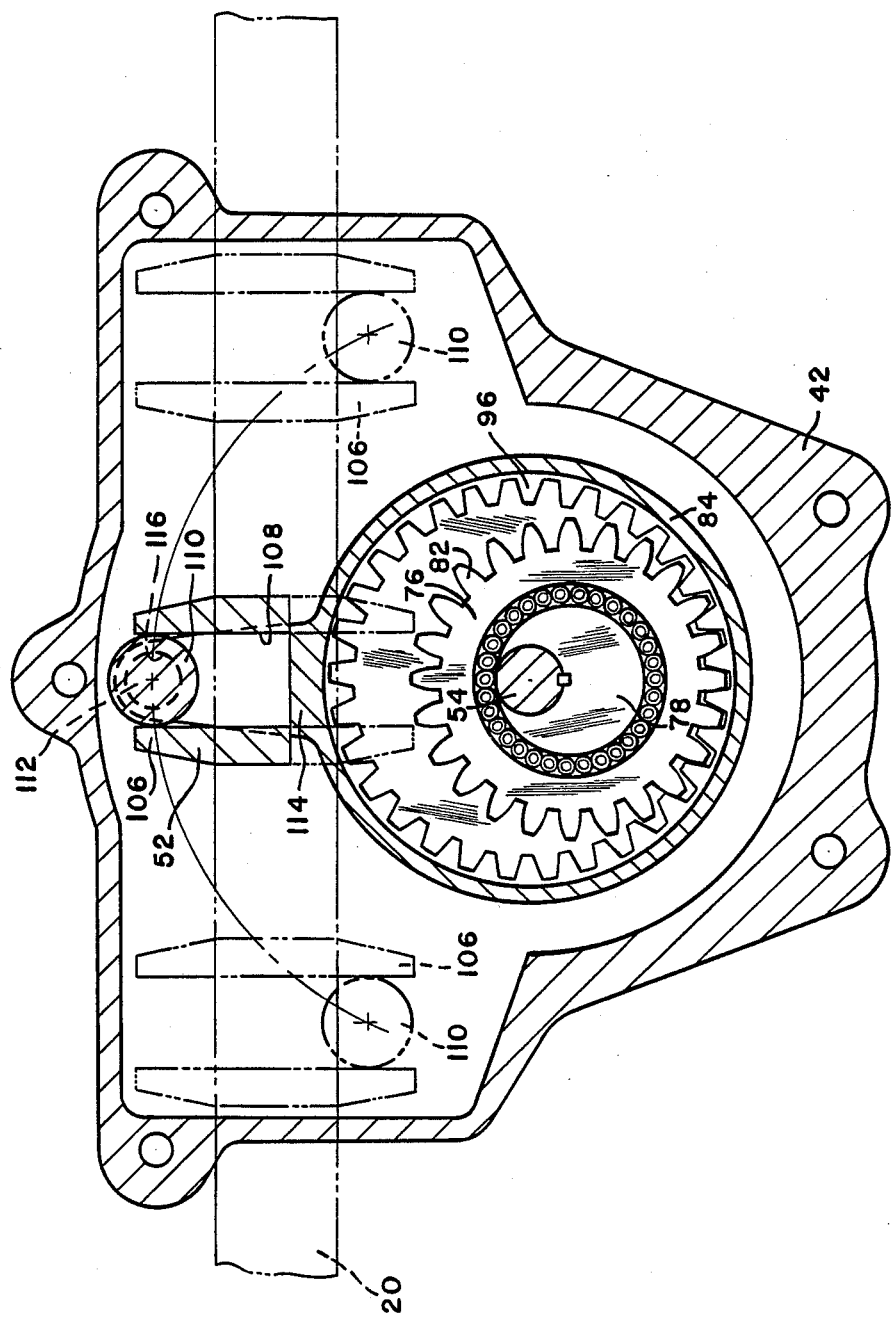

In the Figures, FIG. 1 is a schematic illustration of a steering system with the power assist device of the present invention cooperating therewith; FIG. 2 is a cut away cross section of the electric motor, connecting gear assembly and steering linkage; and FIG. 3 is a cross section taken along line 3—3 of FIG. 2.

A steering system 10 for a vehicle includes a steering wheel 12 connected to a steering shaft 14. The steering shaft terminates in a pinion 16 extending into a rack housing 18 which movably supports a rack 20, see FIGS. 2 and 3. The rack 20 extends outwardly from both ends of the housing 18 to connect with a pair of dirigible wheels 22 and 24. Suitable tie rods 21 and ball joints are connected with the rack 20 to form a steering linkage movable laterally in response to rotational movement of the steering shaft 14. The rack housing 18 is cut out at a location spaced from the pinion 16 to receive a power assist device 30, described in detail hereinafter. A sensor assembly 32 is coupled to the steering shaft 14 to measure torque applied to the latter by a vehicle operator turning the wheel 12. The sensor 32 is connected with an electronic control module 34 to control the operation of the power assist device 30 and a battery 36 provides the source of energy for the power assist device 30 via switch assembly 34.

Turning to FIG. 2, the rack housing 18 is cut open at 40 to connect with a cover plate 42. The cover plate 42 extends above and below the rack housing 18. The cover plate 42 is provided with threaded openings 44 so that the power assist device 30 can be connected to the rack housing 18 via bolts 46 and the cover plate 42. The power assist device 30 includes an electric motor 48 of the reversible type, a gear assembly 50 and a connecting bracket 52. The cover plate 42 cooperates with an end plate 56 to form a cavity 43 receiving the plurality of gears 50. The electric motor 48 includes an armature or output shaft 54 extending through the end plate 56 separating the gear assembly 50 from the windings of the electric motor 48. The end plate is provided with an opening 60 rotatably receiving the armature 54 and carrying a first bearing 62 supporting the armature 54 in the opening 60. The end plate 56 is provided with peripheral openings 64 receiving the bolt 46.

The gear assembly 50 comprises a fixed internal gear 70 secured via bolts 72 to the end plate 56. The fixed internal gear 70 is provided with a plurality of internal teeth 74. An idler gear 76 is carried on an eccentric cam 78 secured to the armature 54. A second bearing 80 is disposed between the idler gear 76 and the eccentric cam 78 to permit free rotation between the eccentric cam 78 and the idler gear 76. The idler gear 76 is provided with a plurality of external teeth 82. An output internal gear 84 is provided with a boss 86 with an opening 88 to rotatably receive the armature 54 and carry a third bearing 90 supporting the armature 54 in the opening 88. The cover plate 42 is also provided with a boss 92 carrying a fourth bearing 94 rotatably supporting the output internal gear boss 86. The output internal gear 84 is provided with a plurality of internal teeth 96 with a different profile than teeth 74. The teeth 96 are formed on an annular ring 95.

The connecting bracket 52 is secured to the rack 20 via a bolt 98. The rack 20 is cut out to form a slot 100 receiving a portion of the connecting bracket 52. A pair of fingers 102 and 104 extend partially over the outer surface of the rack and cooperate with the rack slot 100 to prevent rotation of the connecting bracket 52 about an axis for the bolt 98. The connecting bracket 52 forms a pair of flanges 106 with a slot 108 therebetween extending in a direction normal to the direction of movement for the rack 20. A roller 110 is disposed in the slot 108 and a pin 112 secured to the output internal gear 84 carries the roller 110 on the latter. A radially outwardly extending arm 114 extends outwardly from the ring 95 to form an opening 116 receiving pin 112.

In FIG. 3 the roller 110 and connecting bracket flanges 106 are shown in phantom at the left and right limits for movement of the rack 20 to complete end to end travel therefore. These phantom positions correspond to lock to lock positions for the steering wheel 12.

In operation, the steering wheel 12 is rotated during a steering maneuver to rotate shaft 14 and pinion 16. The torque applied to the shaft 14 will generate a signal for the sensor 32 which in turn activates the module 34 to control operation of the electric motor 30. If the steering wheel 12 is rotated in a clockwise direction in FIG. 1, the pinion 16 will also rotate in a clockwise direction to move the rack 20 out from the plane of FIG. 2 and to the left in FIG. 3. The electric motor 48 is operated by switch 34 to rotate armature 54 in a counter-clockwise direction viewing FIG. 3. The eccentric cam 78 also rotates counter-clockwise in FIG. 3 to move the idler gear 76 in a circular pattern to engage the plurality of teeth 74 for the fixed internal gear 70 and also to engage the plurality of teeth 96 for the output internal gear 84. With the fixed internal gear secured to the end plate 56 and the output internal gear having fewer teeth than the fixed internal gear, the counter-clockwise rotation of the eccentric cam will impart a similar but substantially reduced counter-clockwise rotation for the output internal gear 84. Consequently, the arm 114 will rotate counter-clockwise in the direction of the left phantom in FIG. 3. The roller 110 will impart leftward movement to the connecting bracket 52 to bias the rack 20 to move to the left. In view of the arc traveled by the roller 110, the connecting bracket 52 and rack 20 will be moved through a greater distance when the roller is moved away from the rest or center position shown than when the roller is moving at or near the end of its stop position at the left. This follows from the initial movement of roller 110 being solely in the direction of movement for the rack whereas the roller movement near its stop position is in the direction of rack movement and also in a normal direction to the rack movement direction. As a result, only a portion of the roller movement near the stop position is used to move the rack. This situation generates a variable ratio to impart greater movement to the rack with less force when the roller 110 is near its center and to impart less movement to the rack with greater force when the roller 110 is near its stop position. As a result, the power assist in terms of force imparted to the rack is greater when the vehicle direction is changed drastically, such as experienced in parallel parking with the vehicle speed reduced, and the power assist in terms of movement for the rack is greater when the vehicle direction is slightly altered such as during high speed highway driving.

If the vehicle steering wheel is rotated in a counter-clockwise direction in FIG. 1, rotation of the gear assembly 50 will be reversed from previously described to impart movement to the connecting bracket and rack to the right in FIG. 3 so that the roller 110 is moved in the direction of the right phantom for roller 110.

In a preferred embodiment for the power assist device the electric motor is rated at 500 rpm. The fixed internal gear 70 includes 61 teeth, the idler gear 76 includes 43 teeth, and the output internal gear 84 includes 60 teeth. An alternative embodiment (not shown) replaces the bolts 72 with an electromagnetic assembly to fix the gear 70 to the end plate only when a source of energy from the battery 36 is operating the electric motor. If the battery fails or the electric motor fails, the electromagnetic assembly will free the gear 70 to readily permit manual operation of the gear assembly via movement of the rack.

I claim:

1. A power assist device for a vehicle steering system having a steering wheel connected to a steering gear to control the vehicle direction of travel by means of a pair of wheels cooperating with the steering gear via a steering linkage which includes a rack having a slot, the power assist device comprising an electric motor fixedly carried by the vehicle adjacent the steering linkage and remote from the steering gear, a plurality of gears cooperating with the electric motor and the rack of the steering linkage to impart movement to the rack in response to operation of the electric motor, one of said plurality of gears cooperating with said steering linkage by means of a portion extending into the slot of the rack to form a yoke-like connection which provides a variable ratio between said one gear and said rack so that for a predetermined movement of said one gear, the movement of said steering linkage is greater when said one gear is moved from a rest position corresponding to straight ahead travel for the vehicle than when said one gear is moved from an end position corresponding to turning the vehicle, and power assist force imparted to the rack being greater when said one gear is moved from said end position than when said one gear is moved from said rest position.

2. The power assist device of claim 1 in which said electric motor includes an end plate with an opening for receiving an armature of said electric motor, and said end plate is engaged with another of said plurality of gears to prevent movement of the latter.

3. The power assist device of claim 1 in which said plurality of gears includes another gear fixedly disposed relative to the vehicle and an idler gear engaging said one gear and said another gear.

4. The power assist device of claim 3 in which said electric motor includes an output shaft carrying an eccentric drive member and said eccentric drive member slidably engages said idler gear via a bearing member.

5. The power assist device of claim 1 in which said one gear defines an opening to receive an armature of said electric motor and said one gear rotates relative to said armature.

6. The power assist device of claim 1 in which said one gear defines an annular ring of internally extending teeth and a radially outwardly extending arm from said annular ring cooperates with said steering linkage.

7. The power assist device of claim 1 in which said steering linkage carries a bracket spaced from said steering gear and which defines the slot for receiving the portion of said one gear.

8. The power assist device of claim 1 in which said plurality of gears includes another gear fixedly disposed relative to the vehicle and an idler gear engaging said one and said another gear at substantially the same location, said one and said another gear including a different number of teeth.

9. The power assist device of claim 1 in which said steering linkage is carried within a housing and a cover plate is secured to said housing to carry said electric motor adjacent said steering linkage, said cover plate defining a boss with an opening to receive a portion of said one gear and a portion of said armature.

10. The power assist device of claim 1 in which said rack includes a center line, said electric motor armature extending on one side of said rack center line and said yoke-like connection is disposed on said other side of said rack center line when said one gear is in the rest position.

11. The power assist device of claim 10 in which said yoke-like connection is movable to a position on said one side of said rack center line when said one gear is in the end position.

12. A power assist device for a vehicle steering system wherein a steering wheel is connected to a pinion to impart movement to a rack in response to rotation of the steering wheel and pinion, the power assist device comprising an electric motor coupled to the rack via a plurality of gears and a yoke-like connection, the rack being carried within a housing which also rotatably supports the pinion at a first location, the electric motor, plurality of gears and yoke-like connection being carried by the housing at a second location spaced from the first location, the electric motor being operable during rotation of the steering wheel to impart movement to the rack via the plurality of gears and the yoke-like connection at the second location to avoid further force transfer via the pinion by means of the electric motor, and the electric motor including an armature disposed on one side of the rack while one of the plurality of gears extends to the other side of the rack to compactly arrange the electric motor and plurality of gears relative to the rack.

13. The power assist device of claim 12 in which the rack carries a bracket forming a slot extending in a direction normal to the direction of movement therefore and the one gear extends into the bracket slot to form the yoke-like connection.

14. The power assist device of claim 12 in which the rack housing includes a cover plate secured thereto at an opening in the housing, the elective motor includes an end plate secured to the cover plate to form a cavity for receiving the plurality of gears.

15. The power assist device of claim 12 in which the plurality of gears includes the one gear forming the yoke-like connection with the rack, another gear fixedly carried by the electric motor and an idler gear engageable with the one and the another gears, the one and the another gears defining teeth with different profiles so that the idler gear engages the one gear teeth at a different location than the another gear teeth.

16. The power assist device of claim 12 in which the plurality of gears comprise the one gear connected to the rack, another gear fixedly carried by the electric motor and an idler gear engageable with the one and the another gear, and the armature defines an eccentric cam maintaining engagement between the idler gear and the one and another gears.

17. The power assist device of claim 12 in which the armature defines an axis normal to an axis for the rack, the armature axis being spaced from the rack axis while the armature is substantially below the rack.

18. The power assist device of claim 12 in which the one gear defines an annular ring with a plurality of inwardly extending teeth and an arm extends radially outwardly from the annular ring to form the yoke-like connection with the rack.

* * * * *